Patented Oct. 9, 1923.

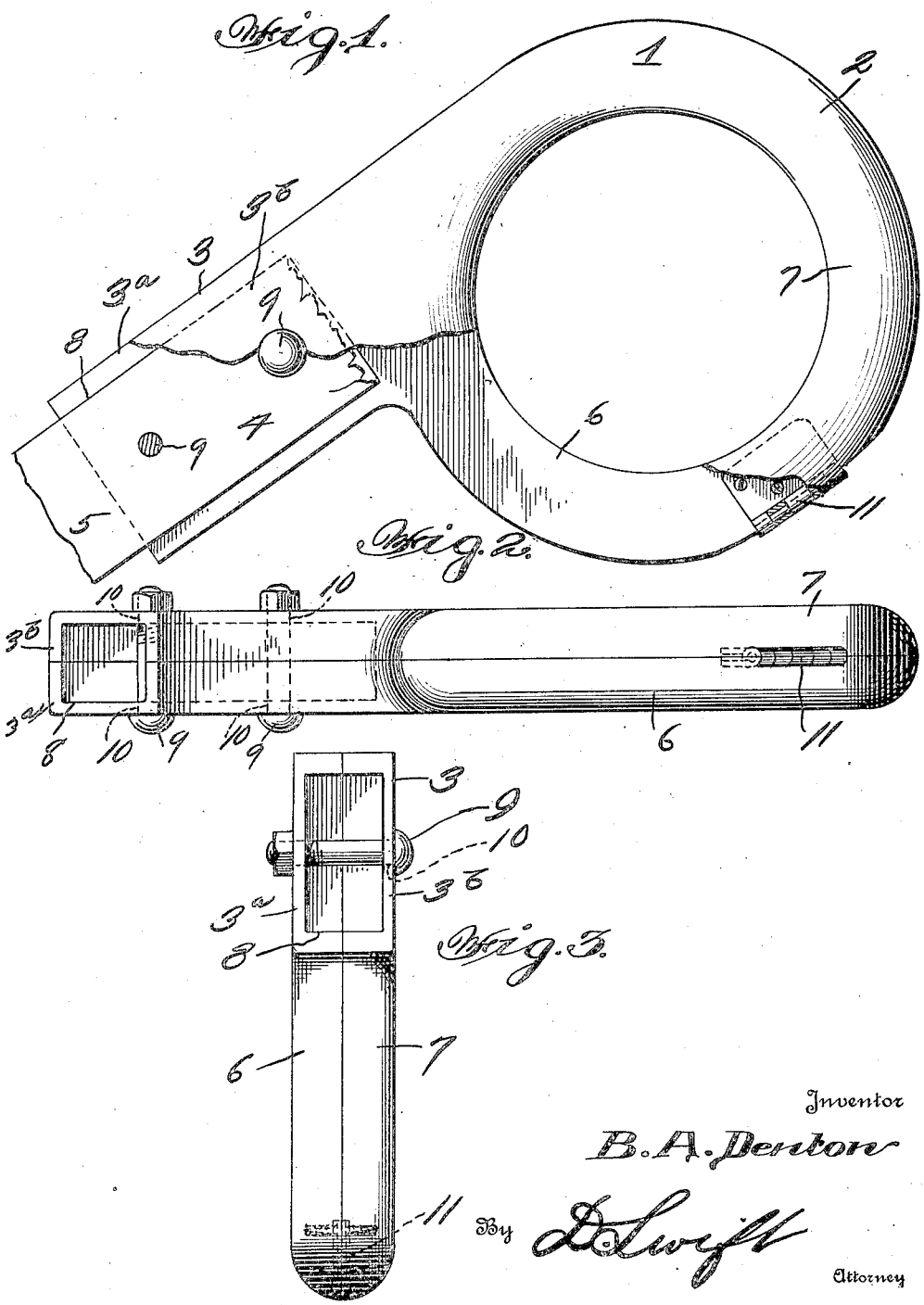

1,470,152

UNITED STATES PATENT OFFICE.

BENJAMIN A. DENTON, OF MORGANTON, NORTH CAROLINA.

HANDLE.

Application filed June 29, 1922. Serial No. 571,823.

*To all whom it may concern:*

Be it known that I, BENJAMIN A. DENTON, a citizen of the United States, residing at Morganton, in the county of Burke, State of North Carolina, have invented a new and useful Handle; and I do hereby declare the following to be a full, clear, and exact description of the invention, such as will enable others skilled in the art to which it appertains to make and use the same.

The invention relates to handles particularly adapted for use in connection with plows and comprising an annular member formed from hinged sections, the sections being provided with recessed extensions for the reception of the end of a plow handle after the same is broken. Also to so construct the handle that injury to the operator of the plow is obviated incident to the plow handle especially when broken coming into engagement with the operator, broken ribs being common from this cause.

A further object is to provide a handle member for plows, trucks and the like, which handle member may be easily and quickly applied to the plow or truck.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 1 is a side elevation of the handle, parts being broken away to better show the structure.

Figure 2 is a bottom plan view of the handle.

Figure 3 is a front elevation of the handle.

Referring to the drawing, the numeral 1 designates the handle which handle comprises an annular grip portion 2 adapted to be grasped by the operator and a tangentially extending portion 3, which portion receives the stub end 4 of a broken plow handle 5. The annular grip member 2 and the extension 3 are preferably formed from metal, for instance cast or stamped and are formed from sections 6 and 7 which register with each other and the portions 3ª and 3ᵇ which form the extension 3 are provided with registering recesses 8, which recesses receive the stub end 4 of the plow handle in such a manner that when the bolts 9 are passed through the apertures 10 of the members 3ª and 3ᵇ, they will securely hold the stub end 4 of the handle member in the extension 3. The sections 6 and 7 are hingedly connected together at 11 in such a manner that when the sections are folded onto each other they will register with each other.

From the above it will be seen that a handle is provided for a plow which is simple in construction and so constructed that it will be impossible for an operator to be injured incident to the stub of a broken handle hitting or piercing the ribs of the operator and the device may be easily and quickly applied to a broken plow handle.

The invention having been set forth what is claimed as new and useful is:—

The combination with a plow handle, of a detachable handle carried thereby, said detachable handle comprising hingedly connected members, said hinged connecting members being provided with annular grip members semicircular in transverse cross section, said annular grip members being provided with tangentially disposed recessed members for the reception of the opposite sides of a plow handle, said hingedly connected members registering with each other when they are folded on each other and means passing through apertures in the recessed extensions for holding said extensions together and holding the plow handle in the recesses thereof.

In testimony whereof I have signed my name to this specification in the presence of two subscribing witnesses.

BENJAMIN A. DENTON.

Witnesses:
  G. F. BRITTINA,
  J. T. OXFORD.